(12) United States Patent
Christensen

(10) Patent No.: US 11,420,148 B2
(45) Date of Patent: Aug. 23, 2022

(54) SYSTEM FOR A SPRAY BOOTH

(71) Applicant: CARHEAL APS, Støvring (DK)

(72) Inventor: Henrik Bro Christensen, Støvring (DK)

(73) Assignee: HURIYA PRIVATE FZLLE, Dubai (AE)

(*) Notice: Subject to any disclaimer, the term of this patent is extended or adjusted under 35 U.S.C. 154(b) by 234 days.

(21) Appl. No.: 16/082,557

(22) PCT Filed: Mar. 9, 2017

(86) PCT No.: PCT/DK2017/050065
§ 371 (c)(1),
(2) Date: Sep. 6, 2018

(87) PCT Pub. No.: WO2017/152920
PCT Pub. Date: Sep. 14, 2017

(65) Prior Publication Data
US 2019/0091621 A1    Mar. 28, 2019

(30) Foreign Application Priority Data
Mar. 9, 2016  (DK) .......................... PA 2016 70137

(51) Int. Cl.
*B01D 53/04* (2006.01)
*B05B 14/43* (2018.01)
*B01D 53/30* (2006.01)

(52) U.S. Cl.
CPC ............ *B01D 53/04* (2013.01); *B01D 53/30* (2013.01); *B05B 14/43* (2018.02); *B01D 2253/102* (2013.01); *B01D 2257/708* (2013.01); *B01D 2258/0258* (2013.01); *B01D 2259/4558* (2013.01)

(58) Field of Classification Search
CPC .............................. B01D 53/04; B01D 53/30
See application file for complete search history.

(56) References Cited

U.S. PATENT DOCUMENTS

| 5,165,969 A |   | 11/1992 | Barlett et al. |
| 5,832,411 A | * | 11/1998 | Schatzmann ...... G01N 33/0075 702/23 |
| 5,905,651 A | * | 5/1999 | Coulibaly ................ G06K 9/00 382/141 |
| 5,970,625 A |   | 10/1999 | Scheufler et al. |
| 6,165,251 A |   | 12/2000 | Lemieux et al. |

(Continued)

FOREIGN PATENT DOCUMENTS

WO      WO2006/107308       10/2006

OTHER PUBLICATIONS

US 5,932,411, 11/1998, Schatzmann et al. (withdrawn)

(Continued)

*Primary Examiner* — Nathan T Leong
(74) *Attorney, Agent, or Firm* — Schmeiser, Olsen & Watts, LLP

(57) ABSTRACT

Provided is a system for a spraying booth, including a spraying booth and at least one filter with at least one VOC detector, the system further including a central database where at least data of the VOC detector are stored, whereby is achieved that the value of the measurements can be accessed and controlled centrally, either by the customer's own technicians or by the supplier's technicians, by a communication unit.

6 Claims, 1 Drawing Sheet

(56) References Cited

U.S. PATENT DOCUMENTS

| | | | |
|---|---|---|---|
| 6,564,154 B1* | 5/2003 | Zimmerman | B05B 12/00 |
| | | | 427/331 |
| 2002/0077716 A1 | 6/2002 | Shadow et al. | |
| 2006/0079637 A1* | 4/2006 | Yuan | C08K 5/34922 |
| | | | 524/612 |
| 2011/0171106 A1 | 7/2011 | Yokoyama et al. | |
| 2012/0296572 A1 | 11/2012 | Hess et al. | |
| 2014/0079652 A1* | 3/2014 | Cooper | B05B 7/2489 |
| | | | 424/59 |
| 2015/0202565 A1 | 7/2015 | Qi et al. | |
| 2015/0296572 A1 | 10/2015 | Tanaka et al. | |
| 2015/0346093 A1 | 12/2015 | Monros | |

OTHER PUBLICATIONS

International Search Report—PCT/DK2017/050065.
Written Opinion—PCT/DK2017/050065.
Danish Search Report dated Oct. 5, 2016 for Application PA 2016 70137.
Supplementary European Search Report dated Jun. 17, 2019 for Application No. EP 17 76 2578.

* cited by examiner

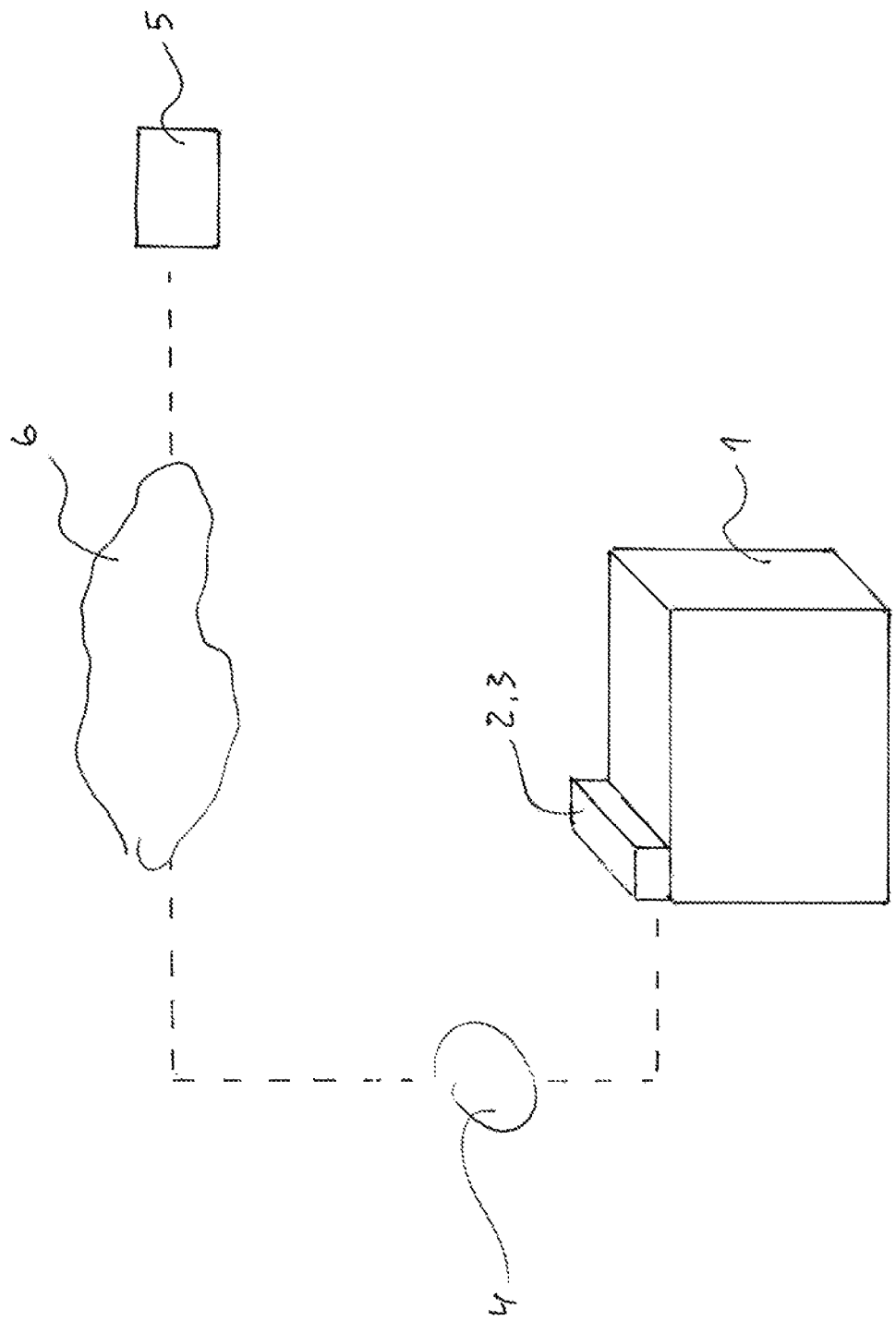

SYSTEM FOR A SPRAY BOOTH

CROSS-REFERENCE TO RELATED APPLICATIONS

This application claims priority to PCT Application No. PCT/DK2017/050065 having a filing date of Mar. 9, 2017, which is based on DK Application No. PA 2016 70137, having a filing date of Mar. 9, 2016, the entire contents both of which are hereby incorporated by reference.

FIELD OF TECHNOLOGY

The following concerns a system including a spraying booth and at least one filter with at least one VOC detector.

BACKGROUND

It is commonly known to use filters in spraying booths, such as active carbon filters, for cleaning and removing e.g. chemicals such as organic solvents from inks, coatings and paints used in the spraying booths.

SUMMARY

An aspect relates to at least one VOC (Volatile Organic Compounds) detector in connection with the spraying booth filter to be able to control/measure/data record in particular the contents of diluent vapours in the exhaust air, where the value of the measurements, besides e.g. a visual indication and/or alarm in the spraying booth at excessive values, can also be accessed and controlled centrally, either by the customer's own technicians or by the supplier's technicians, by means of a communication unit.

According to a first aspect of embodiments of the invention, the above-mentioned object is achieved by a system as mentioned, namely a system for a spraying booth, including a spraying booth and at least one filter with at least one VOC detector, the system further including a central database where at least data of the VOC detector are stored.

This will enable controlling/measuring/data recording of cleaning and removal of chemicals such as organic solvents from inks, lacquers and paints used in the spraying booths, and controlling/measuring/data recording in particular of the contents of diluent vapours in the exhaust air, where an alarm can be activated at the customer and in the spraying booth itself when measuring excessive values, but where the data also can be controlled/measured/data recorded centrally.

The VOC values can e.g. be measured 840,000 times over a four-day period of time.

In a second aspect, embodiments of the present invention also concern a system wherein the spraying booth further includes a communication unit with a data connection.

This will make it possible to have a remotely controlled access to the VOC detector with a high safety level. This can be effected by a physical box by which the data connection can be disconnected, either via the software (WEB browser) or by simply disconnecting the unit physically. There may be a fixed IP address or there may be a DHCP server (Dynamic Host Configuration cat) connected therewith.

In a preferred embodiment, the data connection is an internet connection.

Alternatively, the connection can be established via a 3G, 4G or 5G wireless mobile network, such as e.g. UMTS (Universal Mobile Telecommunications System), W-CDMA (Wideband Code Division Multiple Access).

This enables monitoring of all spraying booths over the world, whereby the technicians of the individual user via a password can be coupled to the system and see data from the customer's own spraying booths and thereby follow their development and history, but also where the supplier's technicians can be coupled to the system and see data from spraying booths of all customers and give help and guidance in connection with the individual system. It is thus possible to notify the user that the system in question, based on comparable data collected from other systems, e.g. emits more volatile organic compounds than average and therefore needs service or other.

The system and thereby also the database is to be controlled by the supplier who is responsible for the security of the users' data but who also have access to the latter and based on these is able to optimise their sales, marketing, maintenance and development strategy in the area.

In a third aspect, embodiments of the present invention also concern a system wherein the database is cloud-based.

Cloud-based, cloud-computing or the cloud are terms that cover delivery of software and services via the internet, providing easy and flexible access and simple administration. Besides, it is possible to scale the cloud server in order to provide enough capacity if the need arises. This may minimise the expenses for hardware. Finally, it is possible to adapt the individual interface for the individual user.

In a fourth aspect, embodiments of the present invention also concern a system wherein the database is further controlled by a controller.

This enables installing e.g. a controller such as a soft plc, microprocessor or pc. In a preferred embodiment, a touch screen is used as well.

In a fifth aspect, embodiments of the present invention also concern a system wherein the control includes at least one additional controllable unit in the spraying booth.

In addition to enabling measuring and documenting of the VOC level in the spraying booth, the control thus enables controlling all frequency-controlled motors, controlling/measuring/data recording of the spraying booth's LED lighting, motors, emergency stop causing all movable parts to stop, air renewal in the spraying booth, filtering systems, ventilation systems, controlling/measuring/data recording of other consumption units, hereby controlling/measuring/data recording other data from the spraying booth such as e.g. pressure, temperature, spraying times and drying times.

The system therefore enables storing of the VOC detector data centrally/internationally as well as decentrally/locally, either by means of a cloud-based database or via a Black Box and thereby as Big Data. The data in the so-called Black Box can be stored locally on-site from where blowers and air can be controlled and from where the data can be accessed, and where indicators for all functions can be seen.

It is thus possible to use the data for many different purposes and from different places, such as e.g. for controlling the consumption of the blowers, VOC in suction inlet and exhaust and warnings regarding the condition of the filters.

In the spraying booth is applied an air pressure which is lower than the air pressure in the air surrounding the spraying booth, also called vacuum. Thereby no contaminated air comes out of the booth. The air is filtered when entering the spraying booth such that dirt, dust and similar is deposited in ink and lacquer. Also, the air passes filters when the air leaves the spraying booth where the filters include a so-called paint stop (a paper filter for separating large particles), a particle filter (a synthetic filter for filtering small particles) and an active carbon filter (for removing/ reducing smoke, vapour, smell and scents), after which the VOC contents of the air are measured as well.

The drying of paint and lacquer is performed by means of UV and IR light, obviating the need for high temperatures in the spraying booth.

In an aspect, embodiments of the present invention concerns use of a system for treating cars.

This will enable using the spraying booth for many other purposes than spraying, painting and coating, among others also for grinding. The spraying booth is thereby actually a multi-booth.

In a further aspect, embodiments of the present invention concerns use of a system wherein the spraying booth is a mobile spraying booth for treating cars.

This will enable work on cars on-site rapidly, easily and flexibly, with many advantages, among others driving to a car painter, without need of courtesy cars. Therefor a substantial saving, among others, can be attained by using the said spraying booth.

The spraying booth is possible to place in e.g. an airport where there i.a. are many rental cars that are returned with dents, scratches and other damages. Travelers can also use the possibility of having their car repaired and painted when they are away travelling.

In a preferred embodiment, the spraying booth can be made of a sandwich material which, apart from keeping the weight down and thereby facilitating mobility of the spraying booth, can also provide noise attenuation from i.a. air intake and air exhaust.

In a further aspect, embodiments of the present invention also concern use of a system wherein the treatment includes the following sequence of operation in the said succession: grind, primer, spray, hardening.

This will enable measuring on all the operational steps grind, primer, spray, hardening (also called sleep).

In a further aspect, embodiments of the present invention concerns use of a system wherein the system collects data for documentation and administration of the treatment.

This will e.g. enable use of the data of the air quality for documentation as to what is done in the booth, how much painting, grinding is performed, when the filters are to be replaced etc.

In a further aspect, embodiments of the present invention concerns use of a system wherein the system controls at least the consumption of paint, lacquers and other consumables.

This will enable use of the data for i.a. measuring the capacity of the filters with the purpose of timely replacement.

BRIEF DESCRIPTION

Some of the embodiments will be described in detail, with references to the following figures, wherein like designations denote like members, wherein:

FIG. 1 shows a system for a spray booth.

LIST OF DESIGNATIONS 1 spray booth
2 filter
3 VOC detector
4 communication unit
5 database
6 cloud

DETAILED DESCRIPTION

FIG. 1 shows a system for a spraying booth 1 having a filter 2 with a VOC detector 3. The data from the VOC detector 3 are sent via a communication unit 4 to a database 5 which is cloud-based 6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. The use of a system for a spraying booth for treating cars, wherein the system comprises:
    a spraying booth, wherein the spraying booth is applied an air pressure, which is lower than an air pressure in the air surrounding the spraying booth, and the spraying booth comprises at least one filter having at least one VOC detector, a communication unit having a data connection, at least one motor, a ventilation system, at least one LED light, a pressure sensor, a temperature sensor, and a sprayer;
    a database coupled to the communication unit via the data connection; and
    a controller coupled to the database via the communication unit and coupled to the spraying booth,
        wherein use of the system comprises operating the controller to:
            control operation of the database, the VOC detector, the at least one motor, the ventilation system, the at least one LED light, the pressure sensor, and the temperature sensor;
            measure a VOC level in the spraying booth and send VOC level data containing the VOC level to the database for storage;
            receive operation information data from the spraying booth and send the operation information data to the database for storage, wherein the operation information data includes operation information of the at least one motor, the ventilation system, the at least one LED light, and the sprayer, spraying booth pressure and temperature readings; spraying times; and drying times; and
            enact an emergency stop to halt all moving parts of the spraying booth, and the system sends warnings regarding the condition of the at least one filter.

2. The use of the system according to claim 1, wherein the spraying booth is a mobile spraying booth for treating cars.

3. The use of the system according to claim 2, further comprising operating the spraying booth to perform a treatment comprising a following sequence of functions in succession: grinding, priming, spraying, and hardening.

4. The use of the system according to claim 3, wherein the operation information data includes an amount of time each function of the sequence of functions of the treatment is performed and the quantity of paint, lacquer and other consumables used in the treatment.

5. The use of the system according to claim 4, wherein use of paint, lacquer and other consumables is regulated by the controller based on the operation information data stored in the database.

6. The use of the system according to claim 1, wherein the database is cloud-based.

\* \* \* \* \*